United States Patent [19]
Cummings

[11] Patent Number: 5,299,721
[45] Date of Patent: Apr. 5, 1994

[54] APPARATUS FOR HOLDING SCUBA TANKS

[76] Inventor: James L. Cummings, 8041 Stone Canyon Cir., Citrus Heights, Calif. 95610

[21] Appl. No.: 7,714

[22] Filed: Jan. 22, 1993

[51] Int. Cl.$^5$ ............................................. B60R 11/00
[52] U.S. Cl. ................................ 224/42.42; 224/42.33; 224/315; 70/164; 70/58; 114/345; 441/40
[58] Field of Search ................ 224/42.42, 315, 42.33, 224/42.32; 114/345, 315; 441/40; 206/486, 490, 561, 562; 220/510, 512; 70/164, 163, 18, 58

[56] References Cited

U.S. PATENT DOCUMENTS

| | | | |
|---|---|---|---|
| 3,602,368 | 8/1971 | Gould | 211/71 |
| 4,168,007 | 9/1979 | Rohatensky | 211/71 |
| 4,266,707 | 5/1981 | Rossman | 224/275 |
| 4,345,861 | 8/1982 | Aarseth | 410/68 |
| 4,391,377 | 7/1983 | Ziaylek, Jr. | 211/71 |
| 4,842,175 | 6/1989 | Towsend | 224/275 |
| 4,899,895 | 2/1990 | Espasandin et al. | 211/71 |
| 4,944,544 | 7/1990 | Dick | 224/42.42 |
| 5,025,935 | 6/1991 | Hadachek | 211/71 |
| 5,154,134 | 10/1992 | Goldsmith | 214/345 |

FOREIGN PATENT DOCUMENTS

| | | | |
|---|---|---|---|
| 2644131 | 9/1990 | France | 114/345 |
| 2169877 | 7/1986 | United Kingdom | 224/273 |

Primary Examiner—Linda J. Sholl
Attorney, Agent, or Firm—Thomas R. Lampe

[57] ABSTRACT

Apparatus selectively positionable in a boat for holding at least one scuba tank. The apparatus includes a receptacle, a cover covering the receptacle interior and having holes for receiving scuba tanks, and lock plates adjustably slidably mounted on side walls of the receptacle for engagement with the boat.

13 Claims, 3 Drawing Sheets

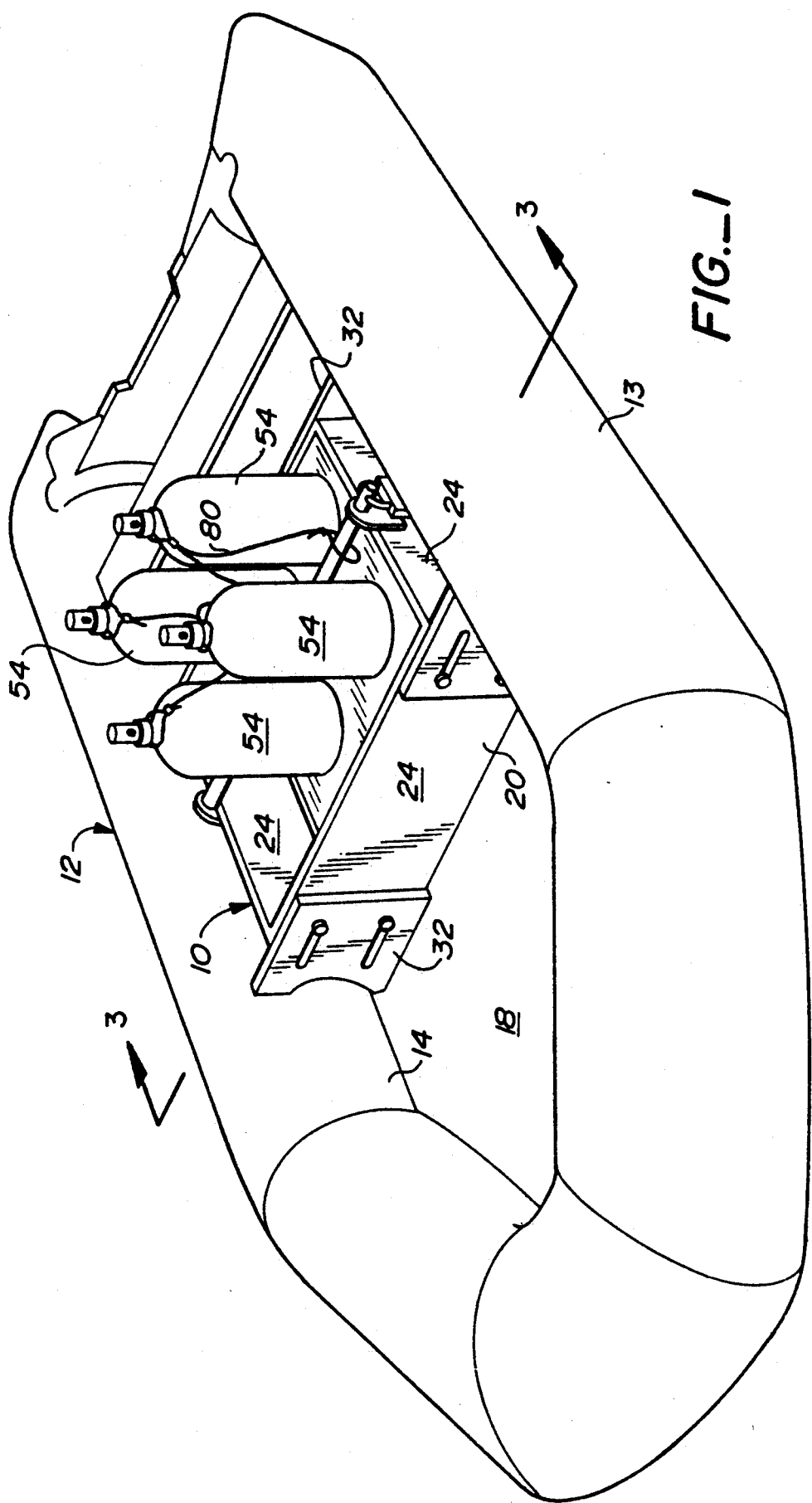

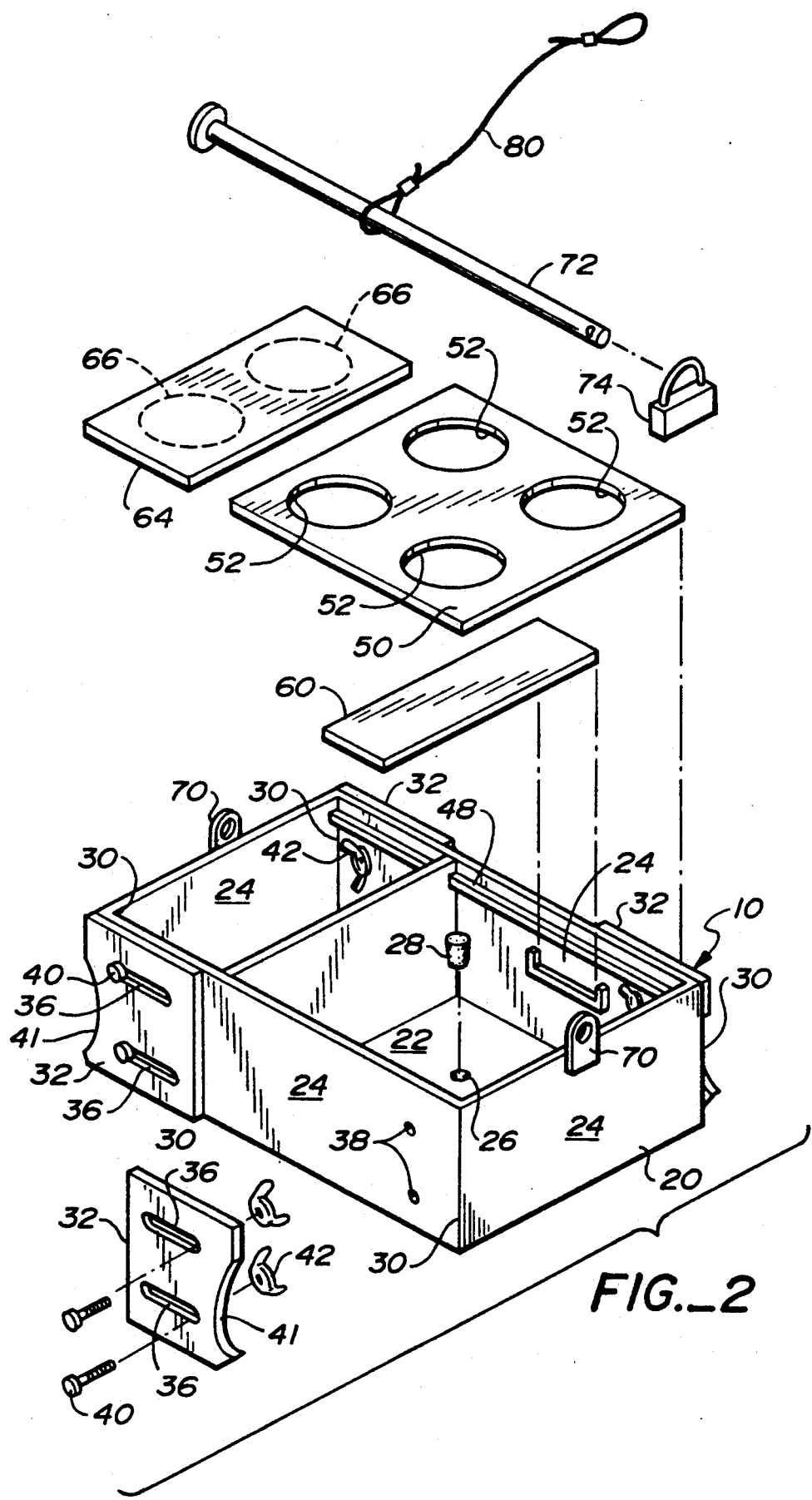
FIG._2

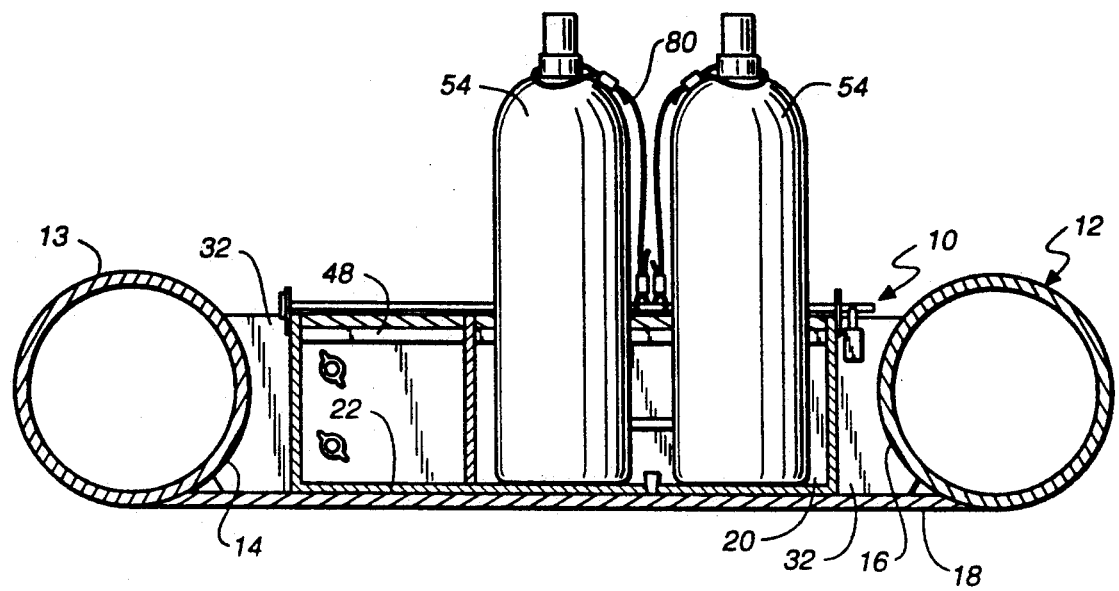
FIG._3
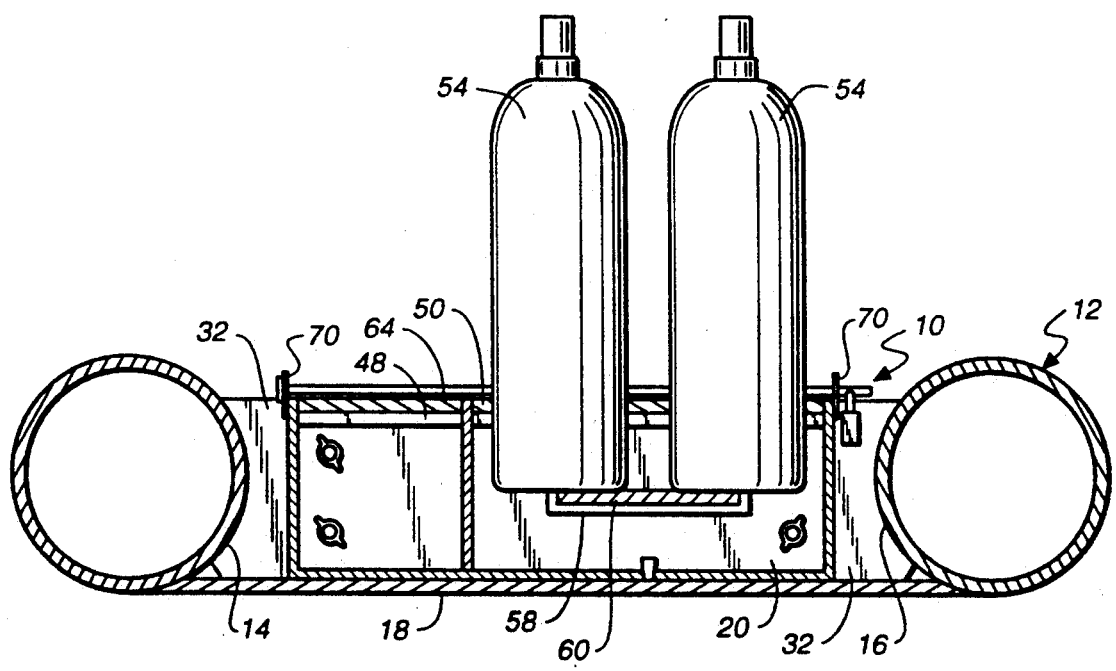
FIG._3A

APPARATUS FOR HOLDING SCUBA TANKS

TECHNICAL FIELD

This invention relates to apparatus for holding scuba tanks. The apparatus is particularly adapted for use in combination with a boat to maintain one or more scuba tanks in position relative thereto.

BACKGROUND ART

A search directed to the present invention located the following United States patents directed to racks and holders for scuba tanks and other types of gas tanks and cylinders: 4,168,007, issued Sep. 18, 1979, 5,025,935, issued Jun. 25, 1971, 4,391,377, issued Jul. 5, 1983, 4,899,895, issued Feb. 13, 1990, and 3,602,368, issued Aug. 31, 1971.

U.S. Pat. No. 5,025,935, issued Jun. 25, 1991, is of particular note in that the patent discloses a scuba cylinder retention rack for attachment to the bed of a pickup truck. The patent also suggests the possibility of attaching the portable retention rack to a boat. The rack of U.S. Pat. No. 5,025,935 is not positively held in place, but rather maintained in position by a spring biased element. Furthermore, the rack is only connected or associated with one side of the vehicle, and sliding between the rack and vehicle can occur. The cylinder or cylinders held by the rack are not elevated relative to the floor of the pickup bed and, in fact, the tank bottoms are positioned directly on the floor of the pickup bed. This means that any cylinder in the rack can fall through the bottom thereof and not be transported thereby when the rack is removed from its location of attachment to the pickup bed.

U.S. Pat. No. 4,345,861, issued Aug. 24, 1982, discloses a support system for large, generally cylindrical tanks in ships. The teachings of this patent do not appear to be at all applicable to racking and storage of scuba tanks. The tanks disclosed in the patent are essentially for permanent installation in a vessel and relate particularly to the transportation of large quantities of LNG.

U.S. Pat. No. 4,842,175, issued Jun. 27, 1989, relates to a general type of storage container for storing articles in the interior of an automobile. The arrangement does not appear to be applicable to the storage of scuba tanks. The storage container utilizes end stabilizers, such as screw clamps, to stabilize the storage elements of the apparatus with respect to the vertical walls of the interior of the automobile. A somewhat similar arrangement is shown in U.S. Pat. No. 4,944,544, issued Jul. 31, 1990. The stabilizing approaches of these latter two patents would not lend themselves to attachment to a relatively resilient surface such as the side of an inflated boat.

DISCLOSURE OF INVENTION

The present invention relates to an apparatus selectively positionable in a boat for holding at least one scuba tank. The apparatus is of relatively simple, inexpensive construction and readily lends itself to manual transport when desired. The apparatus may also be utilized to stow gear other than scuba tanks. The apparatus incorporates structure which positively locks the apparatus into position relative to a boat or other structure. Furthermore, the apparatus incorporates a structural feature which facilitates removal of scuba tanks.

The apparatus incorporates a receptacle including a bottom and a plurality of interconnected side walls extending upwardly from the bottom and defining a receptacle interior therewith. The side walls have upper ends.

A cover is provided for positioning on the receptacle at the side wall upper ends. The cover defines at least one hole therein in communication with the receptacle interior when the cover is positioned on the receptacle. The hole is for receiving a scuba tank supported by and extending upwardly from the receptacle bottom. The cover is cooperable with the scuba tank to maintain the scuba tank in a stable, upright condition relative to the receptacle when the scuba tank extends upwardly through the opening.

Attachment means is operatively associated with the receptacle to attach the receptacle to a boat.

The side walls of the receptacle define receptacle corners. The attachment means includes a lock plate adjustably slidably mounted on a side wall at each of the corners for extension beyond the corners and into engagement with a boat and lock means for selectively locking the lock plates against slidable movement to maintain the lock plates in engagement with the boat at spaced locations on the boat. At least some of the lock plates have contoured distal ends for engagement with generally correspondingly contoured boat structure.

The apparatus additionally comprises a shelf selectively positionable between the bottom and the cover below the opening for supporting a scuba tank extending upwardly through the opening in an elevated condition and spaced from the bottom for facilitating lifting of the scuba tank from the receptacle.

Other features, advantages, and objects of the present invention will become apparent with reference to the following description and accompanying drawings.

BRIEF DESCRIPTION OF DRAWINGS

FIG. 1 is a perspective view of an inflatable boat accommodating apparatus constructed in accordance with the teachings of the present invention;

FIG. 2 is an exploded, perspective view of the apparatus;

FIG. 3 is a cross-sectional view taken along the line 3—3 in FIG. 1 and illustrating scuba tanks positioned on the bottom of the apparatus receptacle; and FIG. 3A is a view similar to FIG. 3, but illustrating the scuba tanks at an elevated position relative to the receptacle bottom for facilitating lifting of the tanks from the apparatus.

BEST MODE FOR CARRYING OUT THE INVENTION

Referring now to the drawings, apparatus constructed in accordance with the present invention is designated by reference numeral 10. In FIGS. 1, 3 and 3A, apparatus 10 is shown positioned in a boat 12. Boat 12 is of conventional construction and includes a generally tubular outer member 13 having inner walls 14, 16. A boat bottom wall 18 extends between the outer tubular structure of the boat. The illustrated boat is merely representative of the types of vessels with which the present apparatus can be operatively associated.

Apparatus 10 includes a receptacle 20 including a bottom 22 and four interconnected side walls 24 extending upwardly from the bottom and defining a receptacle interior therewith. As may clearly be seen, the side walls have upper ends which are in alignment. The receptacle and other components of the apparatus may be constructed of any suitable material, such as plastic, wood, metal or the like. A drain hole 26 may be provided in the bottom 22 and a closure 28 utilized to close the drain hole.

The side walls 24 of apparatus 10 define receptacle corners 30. A lock plate 32 is connected to a receptacle side wall at each of the corners for extension beyond the corners and into engagement with the inner walls 14, 16 of boat 12. Each lock plate 32 has two parallel elongated openings 36 therein. Openings 36 are in partial registry with circular openings 38 formed in a pair of opposed side walls 24.

Bolts 40 project through each pair of partially registered openings and wing nuts 42 are utilized to connect the lock plates to their associated side walls. It will be appreciated that the lock plates are adjustably slidably mounted on their respective side walls so that the ends of the lock plates may be brought into engagement with the boat walls 14, 16 to fixedly mount the apparatus in position relative to the boat. The bolts 40 and wing nuts 42 are employed to fix the lock plates against slidable movement once engagement is had with the boat inner walls.

It will be noted that the lock plates 32 have contoured distal ends. More particularly, the distal ends define round indentations 40 which engage and receive the rounded walls 14, 16 of the boat. Loosening of the wing nuts 42 will allow removal of the apparatus 10 from the boat.

Attached to and extending inwardly from two of the opposed side walls 24 are elongated cover supports 48, only one of which is shown in FIGS. 2, 3, and 3A.

Extending upwardly from bottom 22 between the side walls incorporating the cover supports 48 is a divider wall dividing the interior of receptacle 20 into two compartments. In the arrangement shown, one of the compartments is larger than the other of the compartments.

The larger compartment can be covered by a correspondingly sized cover panel 50 which seats upon those portions of the cover supports which are in the larger compartment. Cover panel 50 has four spaced holes 52 therein which are of a size and configuration generally corresponding to the outer dimensions of scuba tanks or cylinders 54.

Normally, scuba tanks 54 pass through the holes 52 and the bottoms of the tanks engage and are supported by the bottom 22 of the receptacle 20. This position is shown in FIGS. 1 and 3. Thus, the center of gravity of the tanks is as low as possible relative to the apparatus and to the boat so that transport of the tanks is accomplished with the tanks disposed relative to one another in a highly stable manner.

It may, however, be desirable to elevate the tanks after the boat has arrived at a dive site so that the tanks may more easily and readily be lifted from the receptacle. For this purpose, each of a pair of opposed side walls 24 includes a shelf support 58 having a generally U-shaped configuration and extending into the interior of the receptacle. A shelf 60 is positionable on the opposed shelf supports 58 as shown in FIG. 3A. Shelf 60 is located above bottom 22 of the receptacle and below cover supports 48 and cover panel 50. The shelf 60 is also positioned so that it is in partial registry with all of the holes 52 of the cover panel 50. Thus, the shelf 60 may be utilized to support scuba tanks extending upwardly through the holes with the bottoms of the tanks located upwardly from the bottom of the receptacle. This position facilitates lifting of the tanks from the receptacle, for example when the tanks are being positioned for use by a diver.

A cover panel 64 is deployable over the smaller of the two receptacle interior compartments in the same manner that the larger cover panel 50 was deployed over the larger of the two compartments. The cover panel 64 may be solid so that acts as a true closure for the smaller compartment or it may have holes equivalent to holes 52 formed therein to provide for the storage and accommodation of two additional scuba tanks. In FIG. 2 the dash lines 66 designate the positioning of scuba tank holes in cover panel 64 if such are desired.

In the arrangement illustrated, brackets 70 extend upwardly at the ends of the receptacle, such brackets defining aligned apertures. An elongated bar 72 may be passed through the apertures of the brackets and secured in position by a lock 74 disposed through a throughbore formed at an end of the elongated bar. When so positioned, the elongated bar 72 extends over both of the cover panels and is closely adjacent thereto so that the panels cannot be removed from the receptacle. The bar may also be utilized to prevent the removal of the scuba tanks 54 from the receptacle by interconnecting the tanks and elongated bar 72, as shown in FIGS. 1 and 3, with one or more flexible cables or cords 80.

I claim:

1. Apparatus selectively positionable in a boat for holding at least one scuba tank, said apparatus comprising, in combination:

a receptacle including a bottom and a plurality of interconnected side walls extending upwardly from said bottom and defining a receptacle interior therewith, said side walls having upper ends;

a cover for positioning on said receptacle, said cover defining at least one hole therein in communication with said receptacle interior when said cover is positioned on said receptacle, said at least one hole for receiving a scuba tank supported by and extending upwardly from said receptacle bottom, and said cover cooperable with said scuba tank to maintain said scuba tank in a stable, upright condition relative to said receptacle when said scuba tank extends upwardly through said hole; and attachment means operatively associated with said receptacle to attach said receptacle to a boat.

2. The apparatus according to claim 1 wherein said side walls define receptacle corners, said attachment means including a lock plate adjustably slidably mounted on a side wall at each of said corners for extension beyond said corners and into engagement with a boat and lock means for selectively locking said lock plates against slidable movement to maintain said lock plates in engagement with said boat at spaced locations on said boat.

3. The apparatus according to claim 2 wherein at least some of said lock plates have contoured distal ends for engagement with generally correspondingly contoured boat structure.

4. The apparatus according to claim 2 wherein said receptacle side walls and said lock plates define openings in partial registration with each other, said lock means comprising mechanical fasteners extending through said partially registered openings.

5. The apparatus according to claim 1 wherein said receptacle includes at least one divider wall extending between opposed side walls and upwardly from said bottom to divide said interior into compartments, said cover comprising a plurality of discrete cover panels positionable over said compartments.

6. The apparatus according to claim 5 wherein at least one of said cover panels defines a plurality of spaced holes for accommodating a plurality of scuba tanks extending upwardly from said bottom.

7. The apparatus according to claim 1 additionally comprising securement means for selectively securing said cover on said receptacle.

8. The apparatus according to claim 7 wherein said securement means includes an elongated member selectively positionable over said cover and closely adjacent thereto, engagement between said elongated member and said cover preventing removal of said cover from said receptacle.

9. The apparatus according to claim 1 additionally comprising a shelf selectively positionable between said bottom and said cover below said hole for supporting a scuba tank extending upwardly through said hole in an elevated condition and spaced from said bottom for facilitating lifting of the scuba tank from said receptacle.

10. The apparatus according to claim 9 wherein said cover defines a plurality of holes, said apparatus additionally comprising shelf support means attached to at least one side wall between said bottom and the upper end of said side wall for supporting said shelf, said shelf being selectively positionable on said shelf support means in at least partial registry with said plurality of holes and removable from said shelf support means.

11. The apparatus according to claim 1 wherein said boat is an inflatable boat having rounded inner walls, said lock plates having distal ends defining rounded indentations for engaging and receiving said rounded inner walls to maintain said apparatus in fixed position relative to said inflatable boat.

12. The apparatus according to claim 8 including flexible elements for interconnecting scuba tanks in said receptacle to said elongated member for preventing removal of said scuba tanks from said receptacle when said elongated member is positioned over said cover and closely adjacent thereto.

13. The apparatus according to claim 1 additionally comprising cover support means connected to at least some of said side walls adjacent to the upper ends thereof and extending into said interior.

* * * * *